INVENTOR.
HANS-CHRISTOF KLEIN
BY

United States Patent Office 3,490,337
Patented Jan. 20, 1970

3,490,337
FLOW REGULATOR
Hans-Christof Klein, Hattersheim am Main, Germany, assignor to Alfred Teves Maschinen-und Armaturenfabrik KG., Frankfurt am Main, Germany, a corporation of Germany
Continuation-in-part of application Ser. No. 326,270, Nov. 26, 1963. This application July 11, 1966, Ser. No. 565,652
Claims priority, application Germany, Nov. 24, 1962, T 23,071
Int. Cl. F15b 13/04
U.S. Cl. 91—32      16 Claims

ABSTRACT OF THE DISCLOSURE

A flow regulator wherein a train of pulses triggers a valve periodically connecting a load operable by a continuous stream of fluid under pressure with a constant-flow-rate and constant-pressure pump while a second train of pulses triggers a valve during the intervening periods to divert the remaining fluid from the load. A pressure accumulator is connected to the load to smooth the pulses of fluid while the outflow of the pump in un-throttled.

---

This application is a continuation-in-part of my copending application Ser. No. 326,270 filed Nov. 26, 1963, now abandoned.

My present invention relates to a flow regulator for hydraulic and other fluids, in particular a regulator for dividing the output of a fluid pump or other supply source between a plurality of destinations in a predetermined proportion.

Conventional distributors used for dividing such a flow do not always operate with the necessary accuracy and reliability since mechanical obstructions or other flaws sometimes prevent the correct dosing of the fluid quantities delivered by the common supply line to the several branch lines. Moreover, it is difficult with these known devices to maintain an exact ratio between the outgoing flows in the several branch lines if the incoming flow in the common supply line is subject to variation in quantity and/or pressure as is frequently the case in open hydraulic circuits.

The general object of my instant invention is, therefore, to provide an improved regulator for a fluid-distributing system of the type referred to which avoids the above disadvantages.

A more specific object of this invention is to provide a regulator of this type having means for selectively varying the flow proportion over a continuous range.

Fundamentally, a regulator according to my invention comprises an inlet connected to the supply line and as many outlets as there are outgoing branch lines, along with a mechanism for consecutively connecting the inlet to each outlet in each of a series of operating cycles following one another in such rapid succession that a substantially continuous flow is produced in each branch line or in at least one branch line leading to a useful load; the latter situation may arise, for example, when the load is to be supplied with hydraulic fluid at an adjustable rate from a fluid source of constant output, the regulator then having one outlet communicating with the load and another outlet for returning excess fluid to a sump.

The rate of cycling should be so high that the pulsations of the outgoing fluid correspond substantially to those of conventional multipiston pumps, these pulsations being readily smoothed by the inherent elasticity of the conduit system and/or by a fluid reservoir (accumulator) connected to the load line as a hydraulic capacitance.

The alternate or cyclic connection of the inlet to the several outlets can be brought about by the periodic displacement of a valve body which is oscillatable or rotatable in a complementary chamber. Thus, the valve body may have the shape of a piston adapted to be axially reciprocated at the aforedescribed rapid rate, between two alternate operating positions in which communication is established with respective outlets, by suitable drive means which may include one or more electromagnetic coils or solenoids. In particularly, I may provide a pair of such coils which are alternately energized by two interleaved pulse trains, the relative time position of these pulse trains being preferably adjustable to vary the time during which the piston dwells in each operating position at opposite ends of its stroke; it is, however, also possible to utilize a single coil or solenoid, as where the piston forms part of a vibratile system with a natural frequency corresponding to the operating frequency of a source of periodically interrupted (i.e. alternating, raw-rectified or pulsed) current connected to the coil. The vibratile system will further include one or more restoring springs advantageously designed to maintain the solenoid core, in the quiescent state, in such a position relative to the associated coil that energization of the latter will cause an instant displacement of the piston, thereby initiating its vibration. The oscillations of the piston may be further intensified by hydraulic means, specifically by such a shaping of the valve apertures as to give rise to a reaction force and/or by the inclusion of a flow amplifier in series with the regulator, so that control may be maintained with a minimum expenditure of electrical energy. Acceleration by hydraulic reaction may, on the other hand, also be used with a rotary valve body which is particularly convenient when it is desired to distribute the incoming flow over more than two outgoing branches.

The invention will be described hereafter in greater detail, reference being made to the accompanying drawing in which:

FIG. 11, in an axial sectional view taken on line XI—XI of FIG. 12.

Figure 1:
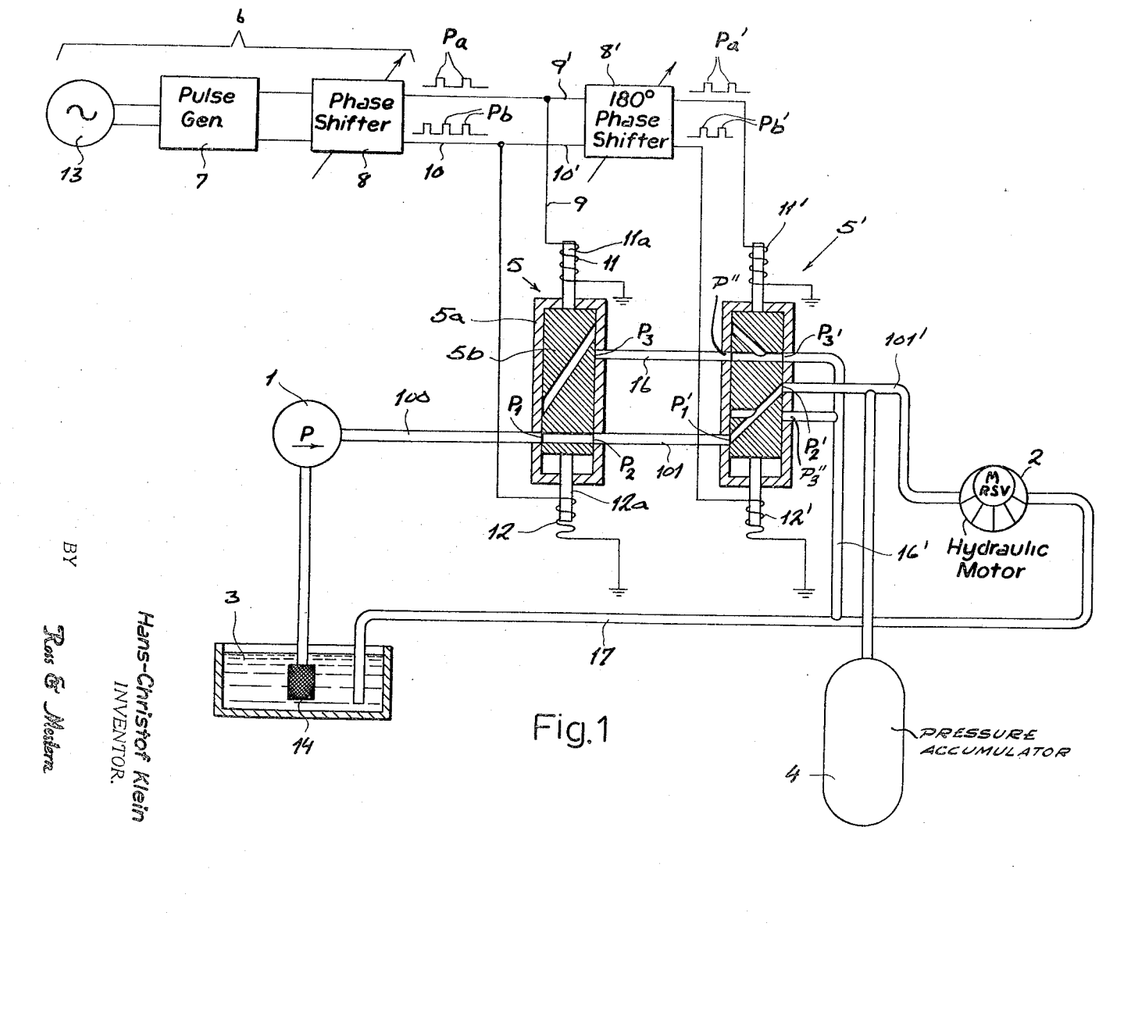
FIG. 1 illustrates, somewhat diagrammatically, a hydraulic system incorporating a pair of regulators according to the invention.

FIG. 1 is a circuit diagram illustrating a hydraulic system with a source of high-pressure fluid represented by a pump 1, a load represented by a hydraulic motor 2, and a sump 3 connected via a filter 14 with the low-pressure or intake side of the pump.

A supply line 100 leads from the delivery side of pump 1 to an inlet $P_1$ of a regulator 5. Two branch lines 101, 16 extend from respective outlets $P_2$, $P_3$ of the regulator, the line 101 leading to the motor 2 by way of a further regulator 5' whereas the line 16, terminating at an ancillary inlet $P_1''$ of regulator 5', is returned to the sump 3 via a connecting line 17. Regulator 5' is substantially identical with regulator 5 and has its main inlet $P_1'$ connected to branch line 101, an extension 101' of that line continuing from its outlet $P_2'$ to the motor 2. A further branch line 16', extending from the two outlets $P_3'$, $P_3''$ of regulator 5', merges with the connecting line 17 which starts at the low-pressure side of the motor. A fluid pressure accumulator 4, serving as a hydraulic capacitance to smooth the flow to motor 2, is connected to the branch section 101'.

Regulator 5 comprises a cylindrical housing 5a and a piston-shaped valve member 5b, of a configuration generally similar to that described hereinafter with reference to FIG. 3, and is provided with a pair of solenoid coils 11, 12 coacting with magnetic cores 11a, 12a on piston 5b for alternately shifting the latter into two extreme positions in which inlet $P_1$ is operatively connected with valves $P_2$ and $P_3$, respectively. The electromagnetic coils 11, 12 are connected, via respective circuits 9 and 10, to different outputs of a source of driving power, generally designated 6, which comprises an alternating-current supply 13, a pulse generator 7 connected thereto and a phase shifter 8 inserted between this pulse generator and the conductors 9, 10. Extensions 9', 10' of these conductors pass by way of a phase shifter 8', adapted to introduce a shift of substantially 180°, to similar coils 11', 12' of regulator 5'.

Figure 2:
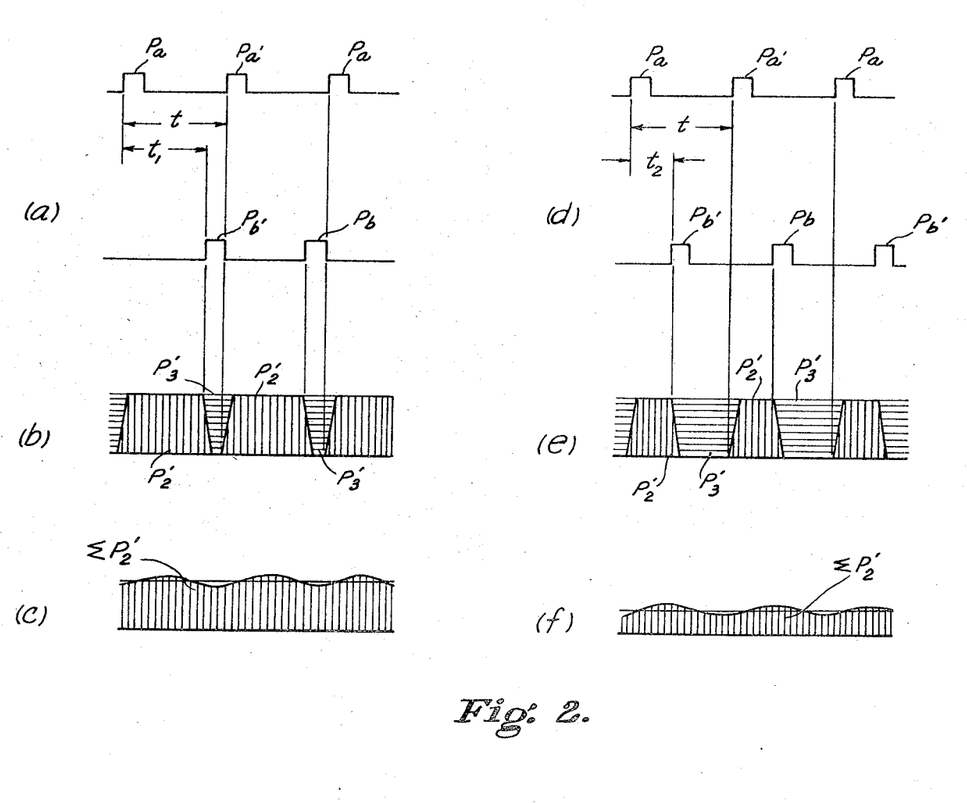
FIG. 2 is a set of graphs illustrating the mode of operation of the system of FIG. 1.

The pulse source 6 produces a train of short pulses $p_a$ on conductor 9 leading to coil 11 and a train of similar pulses $p_b$, interleaved therewith, on conductor 10 leading to coil 12; phase shifter 8' delivers to the coils 11', 12' two similar pulse trains $p_a'$, $p_b'$ 180° out of phase with reference to pulses $p_a$, $p_b$, respectively, as best seen in graphs (a) and (d) of FIG. 2. In graph (a) the spacing of consecutive pulses $p_a$, $p_a'$ or $p_b$, $p_b'$ is shown as a time interval $t$ while the relative displacement between the two pulse trains, introduced by the phase shifter 8, has been designated $t_1$. Thus, as shown in graph (b), outlet $P_2'$ receives fluid pulsations having each substantially the duration $t_1$ whereas outlet $P_3'$ receives pulsations of substantially the duration $t-t_1$. The integrated value of the pulsations at outlet $P_2'$ has been illustrated in graph (c), the flow having been shown smoothed through the action of high-pressure reservoir or accumulator 4 and other parts of the hydraulic circuit.

According to graph (d), the two pulse trains $p_a$, $p_a'$ and $p_b$, $p_b'$ have been relatively displaced by adjustment of phase shifter 8 so that their time difference has been reduced to $t_2$. This results, as per graph (e), in shorter fluid pulses at outlet $P_2'$ and longer pulsations at outlet $P_3'$. Graph (f), finally, illustrates the integrated flow from outlet $P_2'$, the average flow rate having been reduced with reference to the situation illustrated in graphs (a) to (c).

The cascading of two regulators 5, 5', as will be apparent from FIG. 2, results in a pulse frequency which is double that obtainable with a single regulator 5, thus entailing a smoother fluid flow; moreover, the phase shifter 8 requires only a reduced range of adjustability in order to vary the output rate between, say, the magnitudes shown in graphs (c) and (f) of FIG. 2. It will be understood, however, that the mode of operation would be fundamentally the same if the second regulator were omitted with consequent suppression of the pulses $p_a'$ and $p_b'$.

It will be apparent from the foregoing description that the flow in line 101', represented by graphs (c) and (f) of FIG. 2, is unidirectional so that the load 2 can be driven in but one sense. Thus, if this load were a simple hydraulic piston, it could be displaced only in a forward direction by the described system and would have to be reset from time to time, by hand or otherwise, upon interruption of the flow. With a vane-type rotary hydraulic motor (as shown), on the other hand, operation may be continuous. In either case, the flow rate and therefore the load velocity will be controlled by the setting of phase shifter 8 as explained above.

Figure 3:
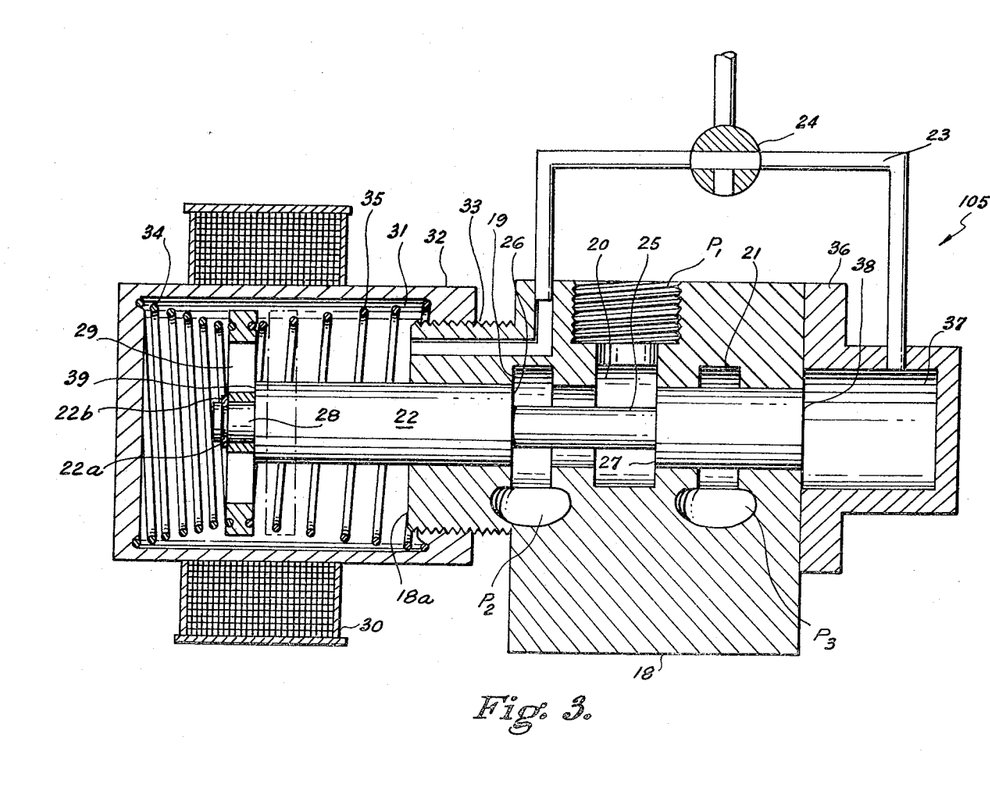
FIG. 3 shows, in axial section, a regulator generally similar to that illustrated diagrammatically in FIG. 1.

In FIG. 3 I have shown a regulator 105 with a housing 18 and a piston 22 axially slidable therein, both the piston and the housing being generally similar to those of regulators 5 and 5' (FIG. 1) except for the means used to oscillate the piston. Housing 18 forms a cylinder chamber with three annular grooves 19, 20 and 21 axially spaced along its inner periphery, the central groove 20 communicating with the inlet $P_1$ whereas the outer grooves 19 and 21 open into the outlets $P_2$ and $P_3$, respectively. Piston 22 is formed with an annular recess 25 which spans the grooves 19, 20 in its limiting left-hand position, i.e. the position illustrated in FIG. 3, and which bridges the grooves 20, 21 in its alternate right-hand position, thereby alternately connecting the inlet $P_1$ with the outlets $P_2$ and $P_3$, respectively.

The housing 18 has a boss 18a with male threads 33 onto which a cylindrical extension 32 has been adjustably screwed. Housing extension 32 defines a fluid compartment 31 at the left-hand end 39 of piston 22, another compartment 37 being formed at its right-hand end 38 by a cap 36 fixedly attached to the housing 18. The two compartments 31, 37 are interconnected by a duct 23 whereby hydraulic liquid from compartment 37 will be displaced into compartment 31 upon a rightward movement of piston 22 and will be returned to compartment 37 upon a subsequent piston stroke to the left.

A solenoid coil 30 is externally mounted on housing extension 32 and coacts with a magnetic core 29 which has the shape of a spoke wheel and serves as an abutment for a pair of compression springs 34, 35 disposed in compartment 31. The two counteracting springs 34, 35 are so dimensioned as to tend to maintain the magnet core 29 in a centered position (as shown in dot-dash lines) in compartment 31, thus in a position which is inwardly offset from the center of coil 30 whereby the core is attracted outwardly upon energization of that coil. Core 29 is mounted on a hub 22a, projecting from the left-hand end 39 of piston 22, and is secured to it by a snap ring 22b.

Figure 5:
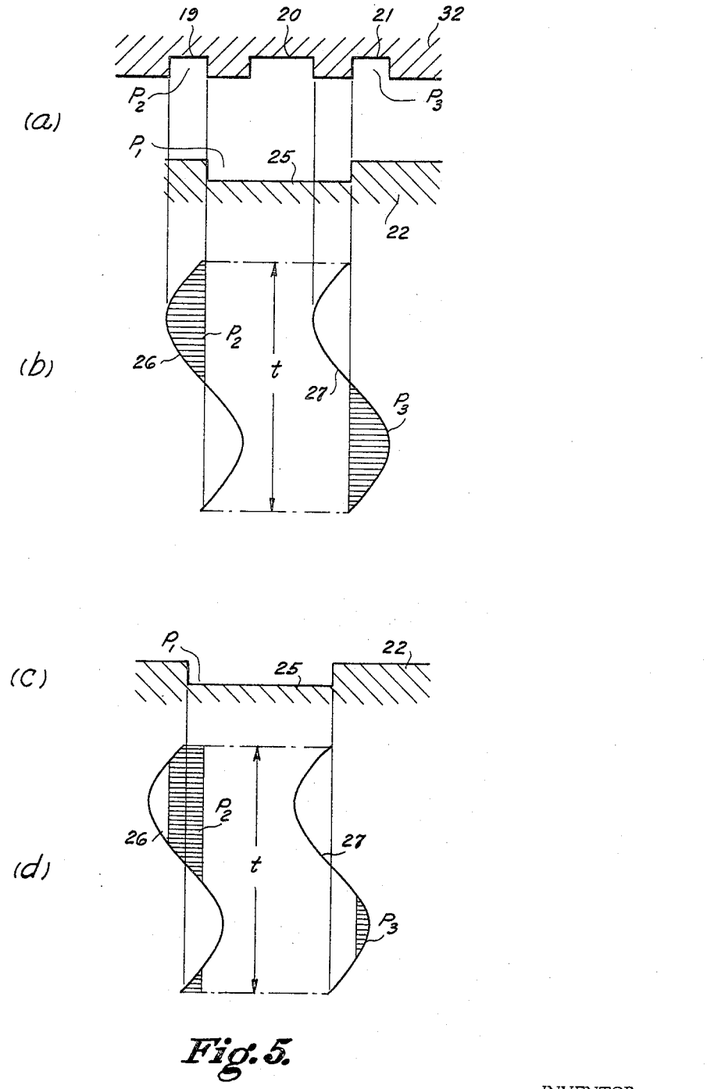
FIG. 5 is a set of graphs further explaining the operation of a regulator as shown in FIG. 3.

The length of the oscillatory stroke of piston 22 is substantially constant since it is determined by the compressibility of the two springs 34, 35; naturally, there should be enough clearance between cap 36 and the right-hand end 38 of piston 22 to permit a full swing in all positions of adjustment of housing extension 32 on boss 18a. Such adjustment is facilitated by the presence of a valve 24 in duct 23, the purpose of this valve being to permit the removal or reintroduction of hydraulic liquid when the compartment 31 is contracted or expanded. Adjustment of cylinder 32 relative to housing 18 will shift the central position of the valve piston 22, corresponding to the dot-dash position of solenoid core 29, with reference to the conduits 19, 20 and 21 of the housing, groove 20 being however large enough to communicate with the annular recess 25 of the piston throughout its stroke in all positions of adjustment. The edges 26 and 27 of that recess, alternately blocking and unblocking the path from inlet $P_1$ to outlets $P_2$ and $P_3$, respectively, will be shifted, however, in relation to the grooves 19 and 21 so that the periods of communication with these outlets within a cycle will be altered. This has been illustrated in FIG. 5 wherein graph (a) shows the alignment of grooves 19–21 and recess 25 in the centered position of core 29 with a setting of sleeve 32 as shown in FIG. 3; graph (b) illustrates the simple harmonic motions performed by the valve edges 26 and 27, the shaded areas indicating the length of time during which each of the outlets $P_2$, $P_3$ is accessible within a cycle of length $t$. Graph $(c)$ shows the recess 25 of piston 22 shifted from its position $(a)$, its new position giving rise to the altered dwell times illustrated in graph $(d)$. Thus, under the conditions shown in graphs $(a)$ and $(b)$ the recess 25 dwells on the grooves 19 and 21 for equal lengths of time, corresponding to $t/2$, whereas in the conditions of graphs $(c)$ and $(d)$ it registesr with groove 19 for a much longer period than with groove 21. The rate of fluid delivery through outlet $P_2$ will, therefore, be increased, at the expense of the flow passing through outlet $P_3$, upon a leftward displacement of cylinder 32 in FIG. 3.

Figure 4:
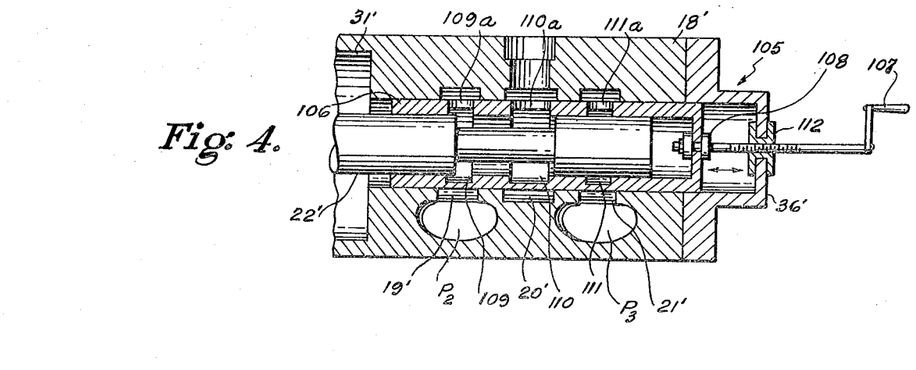
FIG. 4 is a fragmentary sectional view similar to FIG. 3, showing a modification of the regulator.

In FIG. 4 I have shown a regulator 105' which differs from regulator 105 of FIG. 3 by the interposition of a sleeve 106 between its piston 22' and the inner chamber wall of housing 18'. Sleeve 106 has axially spaced annular grooves 109, 110, 111 which, with reference to the annular recess 25' of piston 22', play the same part as the grooves 19, 20, 21 in the preceding embodiment. These grooves 109, 110, 111 communicate, by way of radial bores 109a, 110a and 111a, with similar but wider grooves 19', 20' and 21' in housing 18', the three last-mentioned grooves being in turn connected to the ports $P_2, P_1$ and $P_3$ so that, in any given position of sleeve 106, the system functions in the same manner as that of FIG. 3. In this case, however, compartment 31' may be formed by an integral extension of housing 18' since the axial displaceability of sleeve 106 eliminates the need for an adjustment of that compartment. Sleeve 106, whose grooves 109–111 and bores 109a–111a form part of the conduit system co-operating with the valve piston 22', is shown to be manually displaceable by a control member illustrated as a spindle 107 anchored to the sleeve at 108 and threadedly received in a bushing 112 which is rigid with housing cap 36'. It will be apparent that a rightward shift of sleeve 106 in FIG. 4 has substantially the same effect as a leftward displacement of cylinder 32 in FIG. 3.

The solenoid coil 30 of FIG. 3, as also the corresponding coil in the device of FIG. 4, may be energized by alternating or other periodic current at a frequency which should equal, as closely as possible, the natural frequency of the vibratile system as defined by the piston 22 (or 22'), its restoring springs 34, 35 and the mass of liquid oscillating in the connection 23 between the compartments 31 and 37. Thus, once started, this system will require very little electric energy to maintain its oscillations. It is possible, however, to reduce the consumption of electric energy even further, or to eliminate the solenoid entirely, by promoting or intensifying the oscillations of the valve piston with the aid of hydraulic means. This has been illustrated in FIG. 6 where a supply line 40 emanating from pump 1, which may or may not be the line leading to the inlet of regulator 105, is shown provided with a constriction 41 whereby a pressure differential is created between two conduits 42, 43 branching off the line 40 on opposite sides of that constriction. Serially connected between conduits 42 and 43 are a pair of oppositely facing flow amplifiers 45, 45' with a shut-off valve 50 having an actuating knob 50a.

Figure 6:
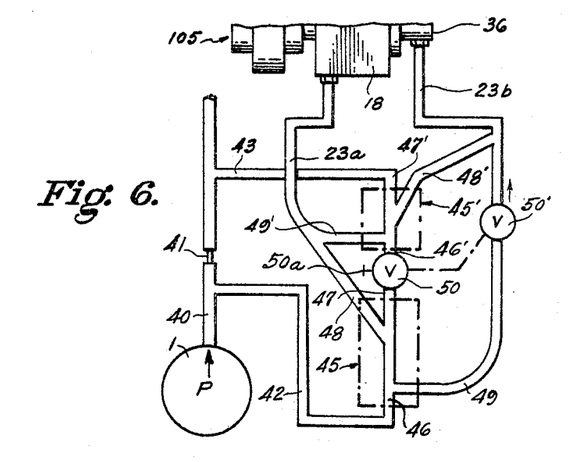
FIG. 6 is a diagrammatic illustration of another system embodying the invention.
Figure 7:
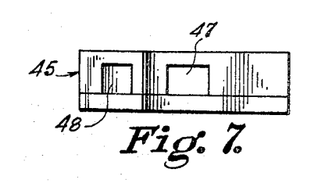
FIG. 7 is a sectional view of a flow amplifier used in the system of FIG. 6.
Figure 8:
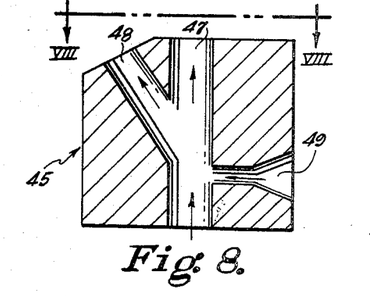
FIG. 8 is an end view taken on the line VIII—VIII of FIG. 7.

The flow amplifiers 45, 45' are identical and are respectively provided with a main entrance port 46 or 46', a main exit port 47 or 47' in line with the main entrance port, a secondary entrance port 49 or 49' perpendicular to the passage 46–47 or 46'–47', and a secondary exit port 48 or 48' extending at an acute angle so that passage, all as clearly illustrated in FIGS. 6 and 7 for the flow amplifier 45. The connecting duct 23 of regulator 105, shown in FIG. 3, has been replaced in FIG. 5 by a fluid line 23a, 23b in series with the secondary passages 48, 49 and 48', 49' of the two flow amplifiers 45 and 45', line section 23a being joined to the ports 48 and 49' whereas line section 23b terminates at the ports 48' and 49. Thus, upon a movement of the displacement flow from compartment 31 to compartment 37 (FIG. 3), i.e. from line section 23a to line section 23b, this flow will be accelerated on its passage through flow amplifier 45' by the main current from line 42, 43 streaming through the principal passage 46', 47' thereof; this flow is concentrated in the amplifier 45' since it cannot pass through the amplifier 45 in the reverse direction. Conversely, upon inversion of the displacement flow during the return stroke of the piston of regulator 105, the flow will concentrate in amplifier 45 and will be similarly accelerated thereby. The system of FIG. 6 may therefore be started by creating a flow in the circuit 42, 45, 50, 45', 43 upon the opening of the shutoff valve 50 with the aid of its knob 50a, provided that the fluid from pump 1 is free to move in line 40 in the quiescent position of the regulator; thus, if line 40 were connected to inlet $P_1$, the spring system 34, 35 (FIG. 3) should maintain the valve piston in the quiescent state in a position in which fluid entering at that inlet can leave via outlet $P_3$ for return to the sump 3 (FIG. 1).

Figure 9:
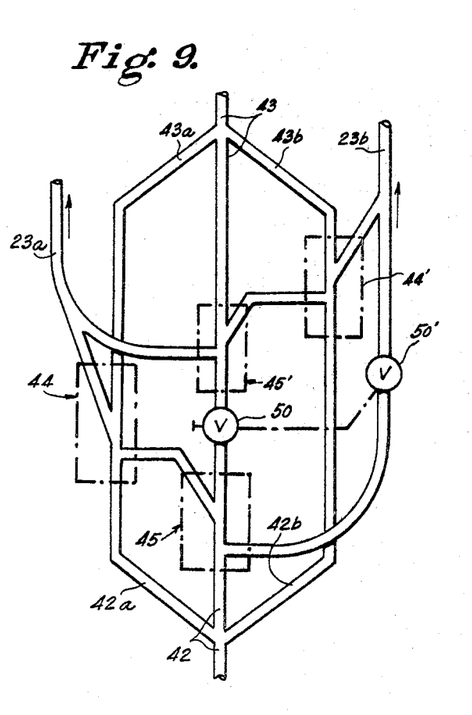
FIG. 9 is a view similar to part of FIG. 6, showing a modification of that system.

In FIG. 9 I have shown a modification of the system of FIG. 6 incorporating a pair of two-stage flow amplifiers. Conduits 42 and 43 are here shown provided each with two branch lines 42a, 42b and 43a, 43b, the lines 42a, 43a being interconnected by the main passage of an additional flow amplifier 44 whereas the lines 42b, 43b are similarly interconnected by the main passage of another such flow amplifier 44'. Fluid moving from line section 23a to line section 23b passes successively through amplifiers 45' and 44', the reverse flow being directed through amplifiers 45 and 44 in succession. In both FIGS. 6 and 9 there is provided an auxiliary shut-off valve 50', ganged with the valve 50, which is inserted in the path from secondary inlet 49 to line section 23b in order to prevent the buildup of fluid pressure in compartment 37 (FIG. 3) in the quiescent state.

Figure 10:
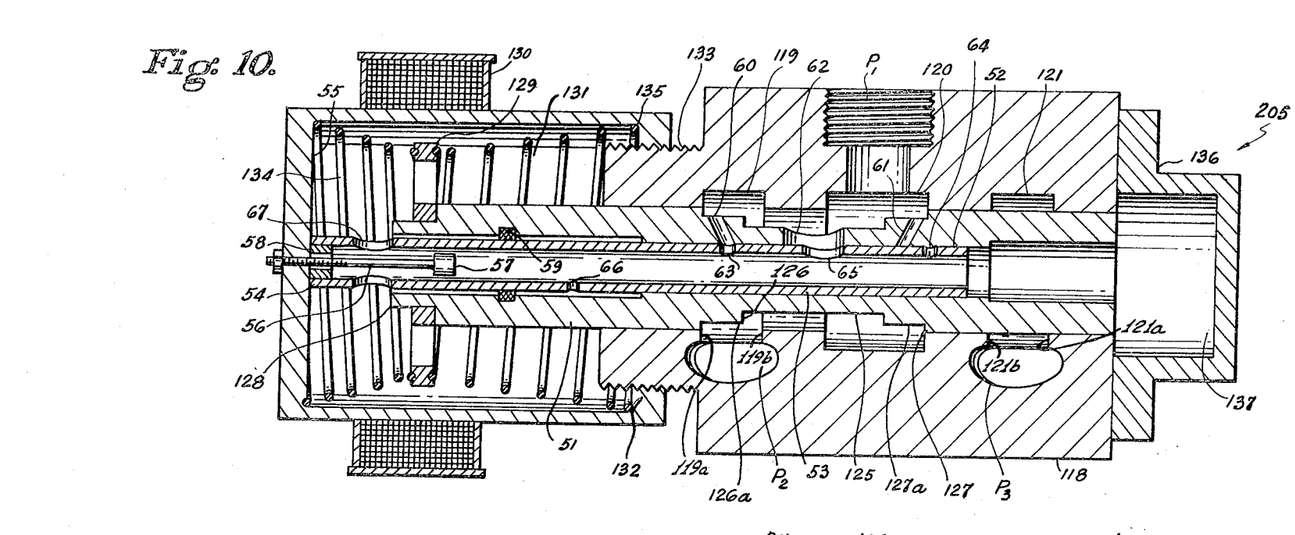
FIG. 10 is a sectional view similar to FIG. 3, showing still another regulator according to the invention.

The regulator 205 shown in FIG. 10, which may be used in the system of FIG. 6 or 9 in lieu of the regulator 105, incorporates additional means for hydraulically intensifying the oscillations of its valve piston. In FIG. 10, elements having counterparts in FIG. 3 have been given the same reference numerals but with a "1" added in the position of the hundreds digit. The piston slidable in housing 118, here designated 51, is tubular and telescopically receives a tubular slider 53 in its longitudinal bore 52. As described in connection with FIG. 3, the solenoid 130 cooperates with piston 51 to oscillate it. Slider 53 is limitedly displaceable in bore 52 in which it is held with a friction fit mainly due to the presence of a bushing 59 of rubber or the like. The axial mobility slider 53 is limited, on the one hand, by contact of its left-hand end 54 with the inner end face 55 of housing extension 132 and, on the other hand, by a head 57 on a stud 56 which extends inwardly from end face 55 and passes through a bushing 58 in slider end 54. The spacing of head 57 from end face 55 is just slightly less than the stroke length of piston 51 so that the latter entrains the slider 53 during the major part of its stroke, a relative shift occurring only as the piston approaches either of its terminal positions. This shift is sufficient to align a radial port 63 of slider 53 with a bore 60 in the piston at the end of its leftward stroke and to align a similar port 64 with a bore 61 of the piston at the end of its rightward stroke. The ports 63, 64 and the bores 60, 61 are the outer pair of a set of three axially spaced ports 63, 64, 65 on the slider and three axially spaced bores 60, 61, 62 on the piston, the central bore 65 of the slider being larger than the other two and being in constant communication with the still larger central bore 62 of the piston. The outer bores 60, 61 are inclined to the radial direction and converge inwardly toward each other; they open onto raised steps 126a, 127a of the annular recess 125 of piston 51, the central bore 62 being disposed between these steps. The bores 60 and 61 are directed toward the outer lateral boundaries 119a and 121a of grooves 119 and 121 at such angles as to give rise to a reaction force, tending to shift the recess 125 away from the respective groove 119 or 121, whenever fluid is discharged through either of these bores into the associated groove and outlet $P_2$ or $P_3$ upon entering the interior of slider 53 from inlet $P_1$ via groove 120, bore 62 and port 65. A further radial port 66 in slider 53 serves for lubrication by admitting some of the hydraulic fluid (e.g. oil) into an annular clearance closed by the bushing 59. A large radial bore 67 in the slider establishes communication between the end compartments 131 and 137, thereby obviating the need for an external connection such as the duct 23 in FIG. 3; it will be apparent that, if the regulator 205 is to be used in the system of FIG. 6 or 9, the passage through slider 53 will have to be blocked so that the displaced fluid can be forced through an external circuit as previously described.

In the position illustrated in FIG. 10, incoming fluid reaches the groove 119 partly through the recess 125 and partly through the passages 62, 65, 63 and 60. As the piston 51 begins to move to the right under pressure of spring 134, its step 126a partly obstructs the direct path between grooves 119 and 120 so that more fluid will traverse the bore 60 and act against surface 119a, thereby intensifying the hydraulic reaction which tends to accelerate the piston toward the right. This acceleration ceases as soon as the edge 126 of recess 125 passes the inner lateral boundary 119b of groove 119, the corresponding boundary 121b of groove 121 being simultaneously cleared by the other edge 127 of that recess so that the fluid from inlet $P_1$ now begins to reach the outlet $P_3$ via groove 121. At this time the slider 53 still occupies its illustrated axial position relative to piston 51 so that bore 61 is blocked. As the piston approaches its extreme right-hand position, head 57 arrests the slider 53 to align its port 64 with the bore 61 of the piston. The progressive compression of spring 135 finally ends and reverses the piston stroke, the return movement of the piston being again accelerated by the reaction force due to passage of fluid through bore 61 toward surface 127 until communication is re-established between ports $P_1$ and $P_2$.

Figure 11:
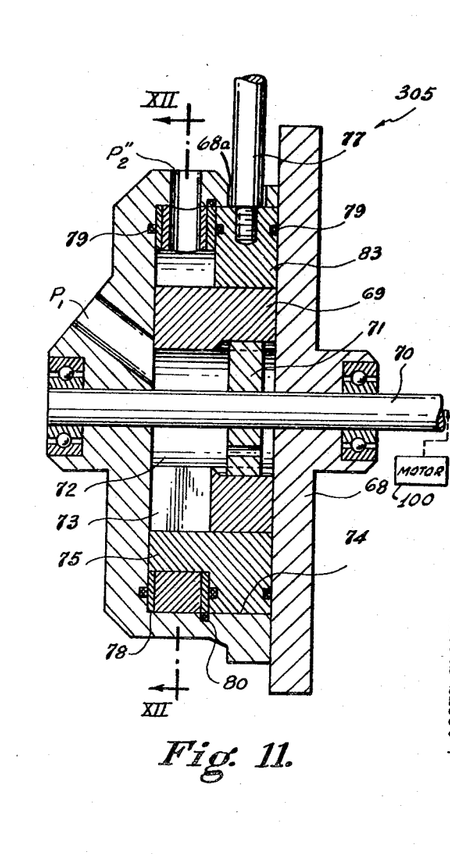
Figure 12:
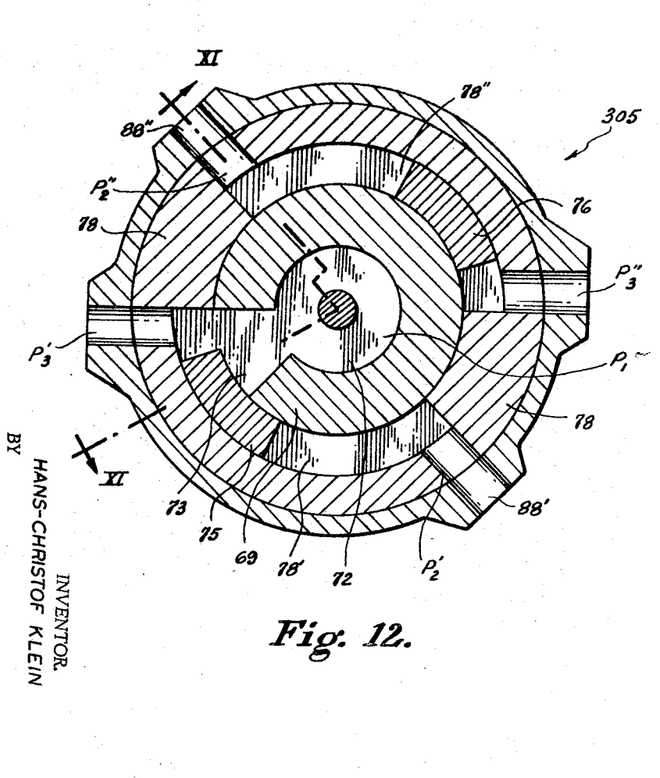
FIG. 12 is a cross-sectional view taken on line XII—XII of FIG. 11, show another embodiment of the invention.

In FIGS. 11 and 12 I have shown a regulator 305 of the rotary type, comprising a generally cylindrical housing 68 in which a valve body 69, supported on a shaft 70 with which it is connected by a key 71, is rotatably journaled. Shaft 70 is continuously driven from a suitable source of motive power, shown diagrammatically as a motor 100.

The rotary valve body 69 is formed with a central bore 72 in permanent communication with the inlet $P_1$. A radial slot 73 registers with a pair of diametrically opposite peripheral grooves 78', 78" in the inner housing wall, these grooves being formed by an annular member 78 rigid with the housing 68. Member 78 also has passages 88', 88" which constitute outwardly directed extensions of grooves 78' and 78", respectively, and which communicate with two diametrically opposite outlets $P_2$' and $P_2$"; the latter may be externally interconnected by a suitable conduit not shown. The other end of each groove 78', 78" communicates in similar manner with a respective outlet $P_3$', $P_3$", which, if desired, may also be externally interconnected. The outlets $P_2$', $P_3$' are separated from each other by an obstruction 75 in groove 78', the outlets $P_2$" and $P_3$" being similarly separated by a diametrically opposite obstruction 76 in groove 78"; both obstructions 75, 76 form part of an annular member 83 disposed alongside the fixed member 78 in an annular recess 74 of housing 68. Peripheral and radial packing rings have been indicated at 79 and 80, respectively.

Member 83 is provided with a handle 77, projecting outwardly through an arcuate slot 68a in the housing, by which it may be manually rotated for altering the length of time during which the passage 72, 73 communicates with the ports $P_2$', $P_2$" and $P_3$', $P_3$" in the course of each revolution of valve body 69. Thus, the angular position of member 83 determines the proportion of the rates of fluid delivery to the two sets of outlets.

Figure 13:
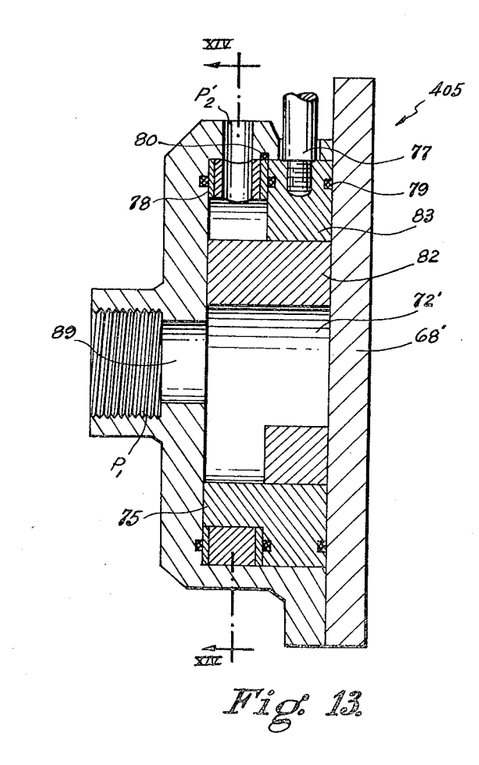
FIGS. 13 and 14, respectively taken on line XIII—XIII of FIG. 14 and on line XIV—XIV of FIG. 13, are views similar to FIGS. 11 and 12 illustrating a modification of the last-mentioned embodiment.
Figure 14:
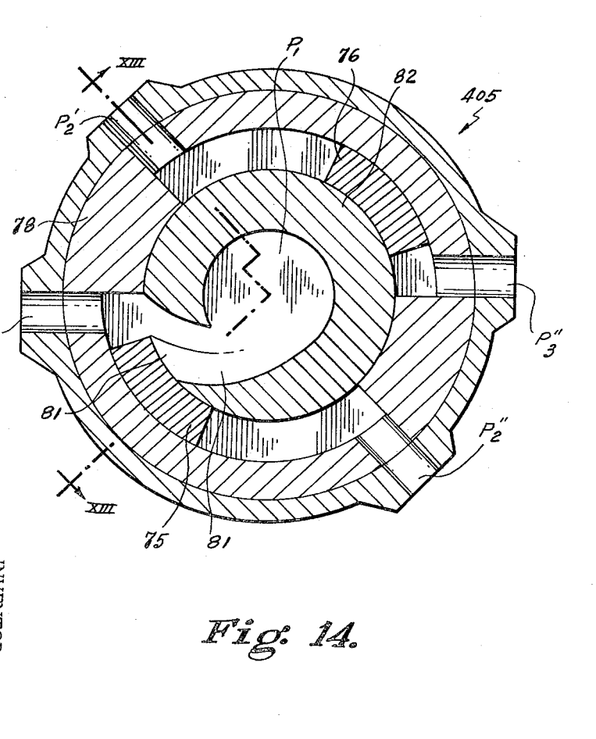

In FIGS. 13 and 14 I have shown a modified rotary regulator 405 which differs from the regulator 305 of FIGS. 11 and 12 only in the shape of its valve body 82. This body has a central bore 72' communicating with inlet $P_1$ via an axial passage 89; a generally radial slot 81 differs from the slot 73 of the preceding embodiment by being flared outwardly and inclined toward the radial direction at a small angle whereby rotation is imparted to valve body 82 by the reaction force of the issuing fluid. Accordingly, a drive shaft is no longer required, the housing 68' being suitably modified as compared with housing 68 of the preceding embodiment. To start the regulator 405, it is thus merely necessary to admit fluid under pressure into inlet $P_1$ and, if required, to shift the control member 83 so that the obstructions 75, 76 will clear the path to outlet $P_3$' or $P_3$" upon incipient rotation. Naturally, a supplemental drive force could nevertheless be provided.

I claim:

1. A flow regulator comprising a chamber with an inlet connected to a source of hydraulic fluid under pressure and two outlets for said fluid including a first outlet connected to a hydraulic motor and a second outlet for returning excess fluid to said source over a path bypassing said motor; and mechanism for controlling the proportion of fluid from said source delivered to said motor, said mechanism including first valve means in said chamber between said inlet and said first outlet, second valve means in said chamber between said inlet and said second outlet, constant-frequency oscillatory drive means for respectively opening said first and second valve means during alternate first and second periods following one another in a succession of cycles rapid enough to insure substantial continuity of fluid flow from said source to said motor, and control means for selectively altering the ratio of fluid directed to said motor during said first periods and fluid diverted to said path during said second periods by adjusting said valve means in a manner varying the relative duration of said first and second periods in each cycle; and first and second valve means being provided with a common piston, said chamber comprising a hydraulic cylinder surrounding said piston and forming a pair of interconnected compartments at opposite ends of the latter.

2. A flow regulator as defined in claim 1 wherein said drive means comprises magnetic core means secured to said piston, electromagnetic coil means positioned to coact with said core means, and a source of periodically interrupted current connected to said coil means.

3. A flow regulator as defined in claim 2, further comprising spring means bearing upon said piston and tending to maintain said core means in a predetermined positon relative to said coil means.

4. A flow regulator as defined in claim 3 wherein said piston, said spring means and a mass of hydraulic fluid in said compartments and their connection constitute a vibratile system with a natural frequency substantially corresponding to the operating frequency of said source of current.

5. A flow regulator as defined in claim 1 wherein said piston is tubular and provided with three axially spaced bores leading from the outside to its interior, said bores including a relatively wide central bore and two relatively narrow outer bores converging inwardly toward each other, said central bore being in constant communication with said inlet, said outer bores respectively communicating with said outlets in said alternate positions, further comprising a tubular slider open toward said compartments and slidably received with frictional fit in said piston for limited axial displacement relative thereto, said slider having three axially spaced radial ports including a central port permanently communicating with said central bore and two outer ports communicating with said outer bores in respective limiting axial positions of said slider relative to said piston, and abutment means in said chamber engageable with said slider in said operating positions of said piston for relatively displacing said slider from one of its limiting positions into the other at the end of each piston stroke whereby one of said outer ports is aligned with the associated outer bore to establish a connection from the interior of said slider to the respective outlet, said outer bores being inclined with reference to the radial direction for creating a reaction force tending to shift said piston into its alternate operating position.

6. A flow regulator comprising a chamber with an inlet connected to a source of hydraulic fluid under pressure and two outlets for said fluid including a first outlet connected to a hydraulic motor and a second outlet for returning excess fluid to said source over a path bypassing said motor; and mechanism for controlling the proportion of fluid from said source delivered to said motor, said mechanism including a valve body in said chamber having alternate positions for respectively establishing communication between said inlet and each of said outlets, constant-frequency drive means for oscillating said valve body between said alternate positions in a succession of cycles rapid enough to insure substantial continuity of fluid flow from said source to said motor, and control means for selectively altering the ratio of fluid directed to said motor during said first periods and fluid diverted to said path during said second periods by relatively adjusting said valve body and said conduit means in a manner varying the relative duration of communication between said inlet and each of said outlets in each cycle.

7. A flow regulator as defined in claim 6 wherein said body is rotatable in said chamber, said drive means including a shaft supporting said body.

8. A flow regulator as defined in claim 6 wherein said body has a central bore permanently communicating with said inlet and a generally radial port leading outwardly from said bore for alternate communication with said outlets, said port being inclined with reference to the radial direction for creating a reaction force tending to accelerate the rotation of said body.

9. A flow regulator as defined in claim 6 wherein said chamber comprises a cylinder provided with an extension forming an end compartment, said body being an axially oscillatable piston extending into said end compartment, said drive means including magnetic core means on said piston in said end compartment, electromagnetic coil means positioned on said chamber to coact with said core means, a source of periodically interrupted current connected to said coil means, and spring means in said end compartment tending to maintain said core means in a predetermined position relative to said coil means, said control means being operable to vary the axial distance between said end compartment and said conduit means.

10. A flow regulator as defined in claim 9 wherein said control means includes an adjustable coupling between said extension and said cylinder enabling relative axial displacement thereof.

11. A flow regulator as defined in claim 9, further comprising an apertured sleeve forming part of said conduit means, said sleeve surrounding said piston within said cylinder, said control means being coupled with said sleeve for axially displacing same.

12. A flow regulator as defined in claim 6 wherein said chamber is a generally cylindrical housing having said body rotatably mounted therein, said housing being provided with an inner peripheral groove interconnecting said outlets, said body having a central bore permanently communicating with said inlet and a generally radial port leading outwardly from said bore for periodic communication with said peripheral groove, said control means comprising an obstruction shiftable in said groove between said outlets.

13. A flow regulator as defined in claim 6 wherein said drive means comprises first and second electromagnetic coil means, a generator of two interleaved trains of current pulses, circuit means connected to said generator for respectively applying said trains to said first and second coil means, said control means including phase-shifting means in said circuit means for altering the relative time position of said pulse trains, and magnetic core means on said body positioned to coact with said first and second coil means whereby said body is alternately shifted into said operating positions in response to pulses from the respective trains.

14. In a system for distributing fluid from a source to two destinations, in combination, a supply line connected to said source; two branch lines respectively leading to said destinations; a first regulator comprising a housing with a set of conduits forming first inlet means connected to said supply line and with two first outlets; a second regulator in cascade with said first regulator comprising a housing with a set of conduits forming second inlet means connected to said first outlets and with two second outlets respectively connected to said branch lines; each of said regulators comprising a valve body in its housing having alternate operating positions for respectively establishing communication between the inlet means and the two outlets thereof; drive means for periodically displacing the valve bodies of said regulators in the same rhythm between said alternate positions thereof at a rate rapid enough to insure substantial continuity of flow through each outlet of said second regulator; and control means for relatively adjusting said valve body and said conduit means of each regulator in a manner varying the relative duration of communication between the inlet means and each of the two outlets thereof during each operating cycle of said drive means.

15. A flow regulator comprising a chamber with an inlet connected to a source of hydraulic fluid under pressure and two outlets for said fluid including a first outlet connected to a hydraulic motor and a second outlet for returning excess fluid to said source over a low-pressure path bypassing said motor; and mechanism for controlling the proportion of fluid from said source delivered to said motor, said mechanism including first valve means in said chamber between said inlet and said first outlet, second valve means in said chamber between said inlet and said second outlet, oscillatory drive means for respectively opening said first and second valve means during alternate first and second periods following one another in a succession of cycles rapid enough to insure substantial continuity of fluid flow from said source to said motor, and control means for selectively altering the ratio of fluid directed to said motor during said first periods and fluid diverted to said path during said second periods by adjusting said valve means in a manner varying the relative duration of said first and second periods in each cycle.

16. A flow regulator comprising a chamber with an inlet connected to a source of hydraulic fluid under pressure and two outlets for said fluid including a first outlet connected to a hydraulic motor, and a second outlet for returning excess fluid to said source over a low-pressure path bypassing said motor; and mechanism for controlling the proportion of fluid from said source delivered to said motor, said mechanism including first valve means in said chamber between said inlet and said first outlet, second valve means in said chamber between said inlet and said second outlet, constant-frequency oscillatory drive means for respectively opening said first and second valve means during alternate first and second periods following one another in a succession of cycles rapid enough to insure substantial continuity of fluid flow from said source to said motor, control means for selectively altering the ratio of fluid directed to said motor during said first periods and fluid diverted to said path during said second periods by adjusting said valve means in a manner varying the relative duration of said first and second periods in each cycle, and pressure-accumulator means connected to said first outlet for smoothing the fluid flow to said motor.

References Cited

UNITED STATES PATENTS

| | | | |
|---|---|---|---|
| 2,888,943 | 6/1959 | Hipple | 91—58 |
| 2,674,231 | 4/1954 | Erickson | 91—39 |
| 2,873,634 | 2/1959 | Moeltzner | 91—39 |
| 3,084,817 | 4/1963 | Lovrenich | 91—39 |
| 3,163,985 | 1/1965 | Bouyoucos | 60—51 |

PAUL E. MASLOUSKY, Primary Examiner

U.S. Cl. X.R.

91—58, 448, 459; 137—624.2